(12) United States Patent
Oakes

(10) Patent No.: US 9,777,756 B2
(45) Date of Patent: Oct. 3, 2017

(54) GLASS EDGE SNAP ATTACHMENT

(71) Applicant: Taylor Made Group, LLC, Gloversville, NY (US)

(72) Inventor: Philip A. Oakes, Middle Grove, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 15/138,948

(22) Filed: Apr. 26, 2016

(65) Prior Publication Data

US 2016/0311505 A1    Oct. 27, 2016

Related U.S. Application Data

(60) Provisional application No. 62/153,205, filed on Apr. 27, 2015.

(51) Int. Cl.
*F16B 1/00* (2006.01)

(52) U.S. Cl.
CPC ...................... *F16B 1/00* (2013.01)

(58) Field of Classification Search
CPC ........... B60J 7/104; B63B 19/02; B63B 17/02
See application file for complete search history.

(56) References Cited

U.S. PATENT DOCUMENTS

| | | | |
|---|---|---|---|
| 2,925,303 A * | 2/1960 | Lane | B60J 7/104 296/102 |
| 2,961,725 A * | 11/1960 | Mcgee | B63B 17/02 114/361 |
| 4,254,931 A | 3/1981 | Aikens et al. | |
| 4,524,941 A | 6/1985 | Wood et al. | |
| 4,692,969 A * | 9/1987 | Johnson | B60J 1/006 16/87.2 |
| 5,339,763 A | 8/1994 | Erskine | |
| 5,441,095 A | 8/1995 | Trethewey | |
| 5,797,643 A * | 8/1998 | Demedash | B60J 7/104 160/368.1 |
| 5,839,388 A | 11/1998 | Vadney | |
| 6,595,155 B1 | 7/2003 | Akers | |
| 6,800,160 B2 * | 10/2004 | Norman | B60J 1/02 114/361 |
| 7,281,486 B2 * | 10/2007 | Bach | B63B 17/02 114/361 |
| 7,434,534 B2 | 10/2008 | Erskine et al. | |
| 7,555,818 B2 | 7/2009 | Erskine et al. | |
| 7,721,487 B2 | 5/2010 | Costigan et al. | |
| 9,068,359 B2 | 6/2015 | Erskine et al. | |
| 9,266,474 B2 | 2/2016 | DeWard et al. | |
| 2009/0229094 A1* | 9/2009 | Reese | B60J 1/006 24/530 |

* cited by examiner

*Primary Examiner* — Edwin Swinehart
(74) *Attorney, Agent, or Firm* — Nixon & Vanderhye P.C.

(57) ABSTRACT

A fastener attachment includes a main panel, a fastener component secured on one side of the main panel, and a channel cooperable with the main panel and extending from an opposite side of the main panel. The fastener attachment may be attachable to a boat windshield and provides an easily securable fastener component so that a cover or the like can be secured over the windshield.

7 Claims, 2 Drawing Sheets

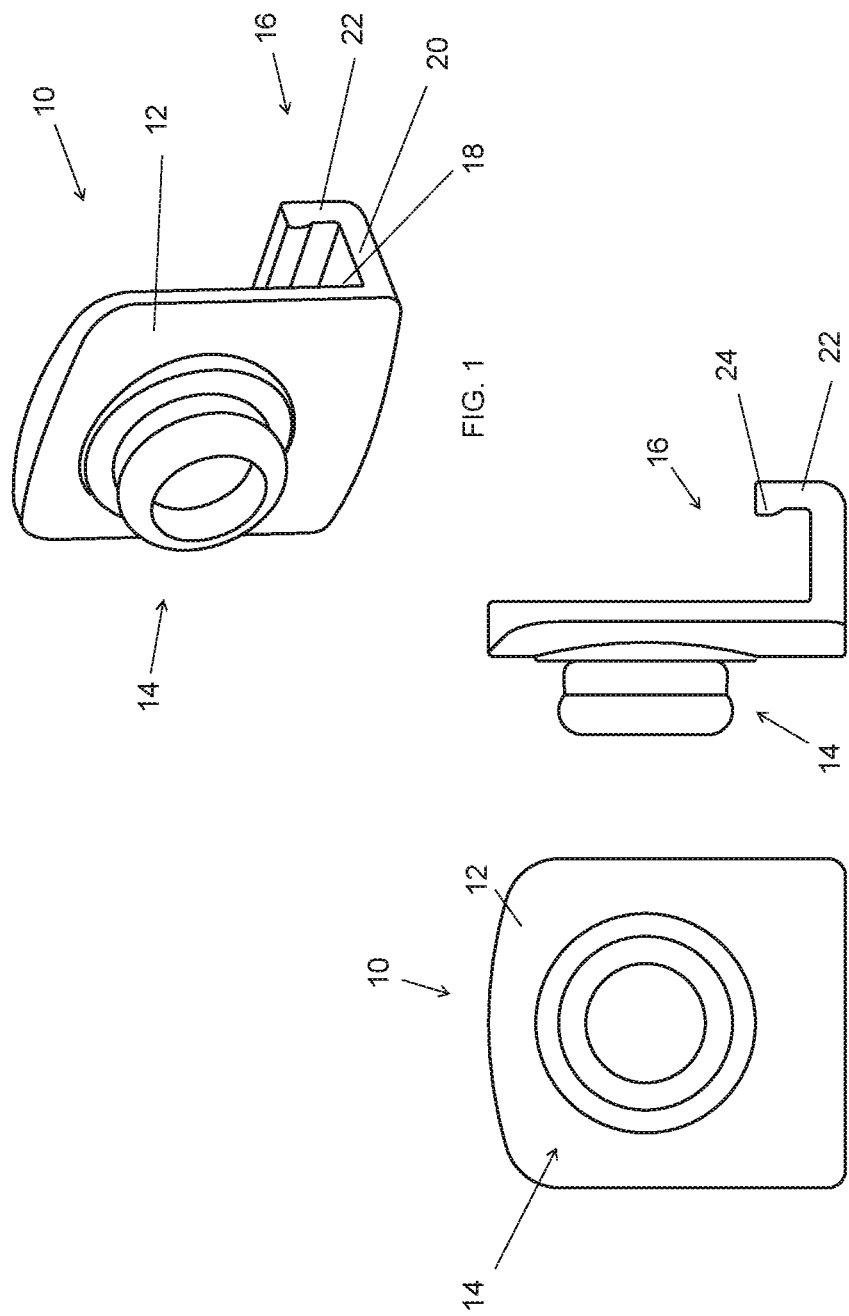

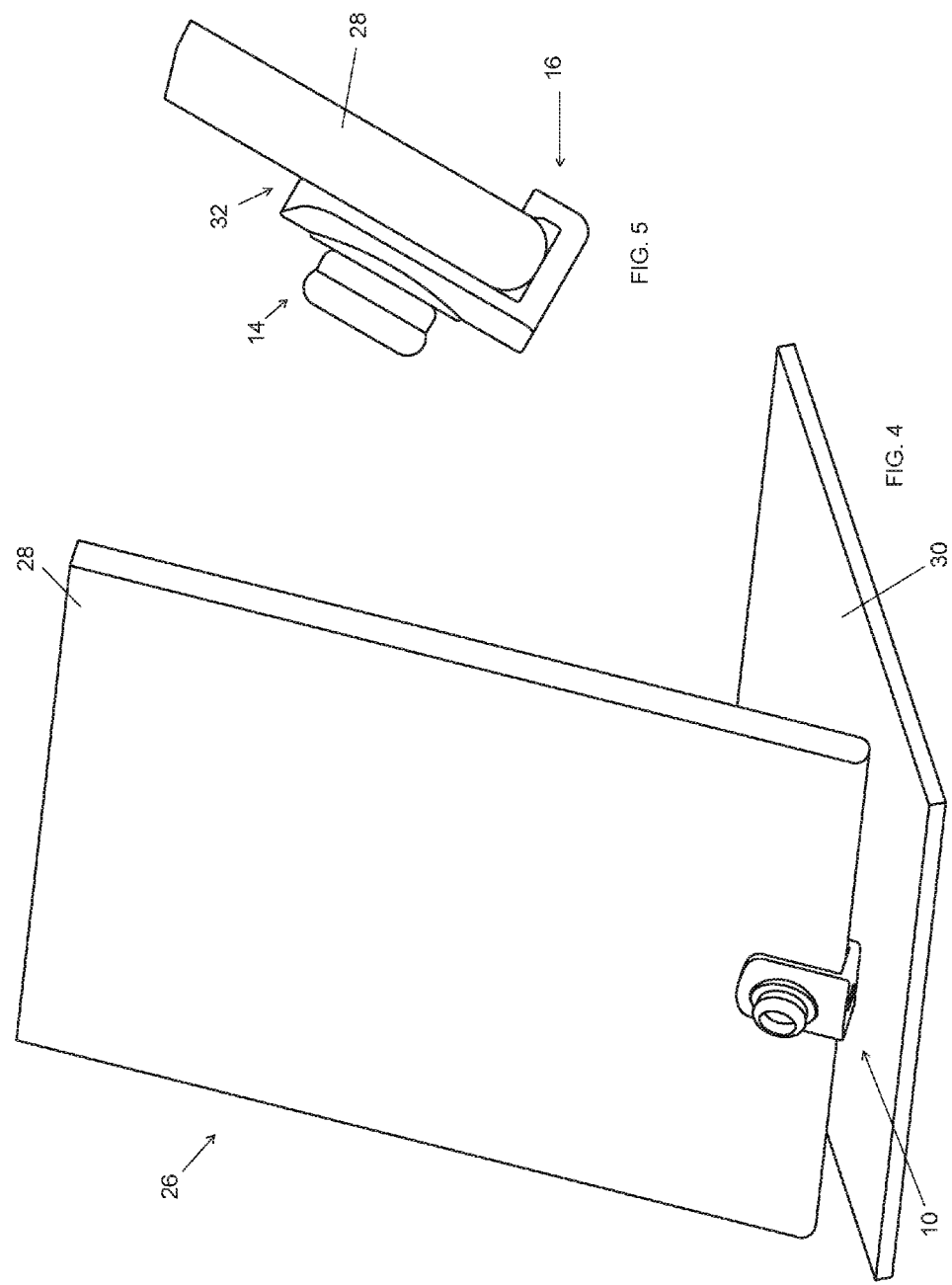

GLASS EDGE SNAP ATTACHMENT

CROSS-REFERENCES TO RELATED APPLICATIONS

This application claims the benefit of U.S. Provisional Patent Application No. 62/153,205, filed Apr. 27, 2015, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The invention relates to fasteners for attaching canopies or fabric coverings to objects or vehicles that are to be protected from wear or from inclement weather. More specifically, the invention relates to fastener attachments or clips for attachment to an edge such as a bottom edge of a boat windshield by which a removable cover or some other structure may be secured over the windshield.

As is well known, many pleasure boats today have windshields that project upwardly from the gunwales and front deck of the boat. The exposed edges of the windshield are typically comprised of a protective trim usually of vinyl, aluminum or stainless steel construction. Most boats of this type also have flexible tops or removable covers to protect the boat when it is not in use or during inclement weather. These covers or tops are typically formed of a flexible material such as canvas or other waterproof fabric, and are fastened to the exposed edge of the windshield by conventional fastener means. In many windshield constructions, fasteners are attached directly to the windshield trim at spaced locations along the upper edge of the windshield. Each fastener clip mounts a conventional fastener, such as a male snap fastener component, that is designed to mate with a corresponding female component that is affixed to the flexible top or removable cover.

BRIEF SUMMARY OF THE INVENTION

The present invention describes an attachment member or clip that is securable over an edge, such as a bottom edge, of a windshield that includes a fastener component such as a male snap fastener component for receiving a complementary fastener component secured to a boat cover or the like. When the boat is in storage or prepared for transport, it is desirable that the cover extend over the windshield. The clips according to the described embodiments provide easily securable fastener components so that a cover or the like can be secured over the windshield. Other accessories may be attachable to the clip including, for example, an antenna, a cup holder, etc.

In an exemplary embodiment, a fastener attachment includes a main panel, a fastener component secured on one side of the main panel, and a channel cooperable with the main panel and extending from an opposite side of the main panel. In some embodiments, the channel may include a portion of the main panel opposite side, a channel bottom extending from the portion of the main panel opposite side, and an upturned channel edge. In this context, the upturned channel edge may include a shoulder at a distal end thereof. The main panel and the channel may define an L-shape. The fastener attachment may also include an adhesive on the main panel opposite side. The main panel, the fastener component and the channel may be molded as one piece.

The fastener component may include one half of a two-part fastener. In some embodiments, the fastener component may include one of a male half and a female half of a snap fastener.

In another exemplary embodiment, a windshield assembly includes a windshield securable to a boat hull, and a plurality of fastener attachments secured to the windshield. Each of the fastener attachments includes a main panel, a fastener component secured on one side of the main panel, and a channel cooperable with the main panel and extending from an opposite side of the main panel. The channel is positioned over an edge of the windshield with the fastener attachments facing outward. The fastener attachments may be secured to the windshield with an adhesive. In some embodiments, the channel may include a portion of the main panel opposite side, a channel bottom extending from the portion of the main panel opposite side, and an upturned channel edge. In this context, the fastener attachment may be secured to the windshield such that the windshield edge is positioned on the channel bottom between the portion of the main panel opposite side and the upturned channel edge.

BRIEF DESCRIPTION OF THE DRAWINGS

These and other aspects and advantages will be described in detail with reference to the accompanying drawings, in which:

FIG. 1 is a perspective view of the fastener attachment according to the described embodiments;

FIG. 2 is a front view of the fastener attachment;

FIG. 3 is a side view of the fastener attachment;

FIG. 4 is a perspective view of a windshield assembly incorporating a fastener attachment; and FIG. 5 is a side view of the windshield assembly.

DETAILED DESCRIPTION OF THE INVENTION

FIGS. 1-3 show various views of the fastener attachment 10 according to the described embodiments. The fastener attachment 10 includes a main panel 12, a fastener component 14 secured on one side of the main panel 12, and a channel 16 cooperable with the main panel 12 and extending from an opposite side of the main panel 12. The channel 16 is defined by a portion 18 of the main panel opposite side, a channel bottom 20 extending from the portion 18 of the main panel opposite side and an upturned channel edge 22. As shown, the main panel 12 and the channel 16 define an L-shape. As seen in FIGS. 1 and 3, the upturned channel edge 22 may be provided with a shoulder 24 at a distal end thereof. The fastener attachment 10 may be molded as one piece.

The fastener component 14 is generally one-half, i.e., one part, of a two-part fastener. For example, the fastener component 14 may include one of a male half and a female half of a snap fastener.

FIGS. 4 and 5 show an exemplary application of the fastener attachment 10 as part of a windshield assembly 26. The windshield assembly 26 includes a windshield 28 securable to a boat hull 30 or the like. A plurality of fastener attachments 10 are secured to the windshield 28. As shown in FIG. 5, the channel 16 is positioned over an edge of the windshield 28 with the fastener attachment 14 facing outward. That is, the fastener attachment 10 hooks around an exposed edge of the windshield 28. In some embodiments, the back side of the main panel 12 is glued to the windshield 28 with an adhesive. The adhesive is preferably used for a primary hold, while the channel 16 helps to align and hold the fastener attachment 10 during installation as well as providing secondary support.

The fastener attachment 10 may alternatively be overmolded onto the windshield 28. Overmolding is a manufacturing process where a part or component is put into, or part of, an injection mold. In the present application, the glass or panel edge may be inserted into a plastic injection mold, and the fastener attachment 10 would then be formed around the glass 28.

In use, the fastener attachments 10 are mounted or overmolded over the exposed edge of the windshield 28. In some embodiments, the fastener attachments 10 may be secured over the bottom edge of the windshield 28. Additionally, the windshield 28 may be mounted with a conventional trim member to secure the windshield 28 to the boat deck with the fastener attachments 10 secured to the windshield 28 between the windshield 28 and the trim member. Some trim designs do not extend over a bottom edge of the windshield, and the faster attachments 10 could thus attach directly to the bottom edge of the windshield 28 without a visible trim member.

The clips 10 are preferably spaced 8-10" apart to secure a cover or the like. In the exemplary application shown in FIG. 4, the fastener component 14 of the fastener attachment 10 is the male portion of a snap fastener, while the female portions would be attached to the boat cover.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A fastener attachment comprising:
 a main panel delimited by first and second ends;
 a fastener component secured on one side of the main panel between the first and second ends of the main panel, wherein the fastener component comprises one half of a two-part fastener; and
 a channel cooperable with the main panel and extending from an opposite side of the main panel and from one of the first and second ends, wherein the channel comprises a portion of the main panel opposite side, a channel bottom extending substantially perpendicularly from the portion of the main panel opposite side in alignment with the one of the first and second ends, and an upturned channel edge extending substantially perpendicularly from the channel bottom and substantially parallel with the main panel, and wherein the main panel and the channel are formed as one piece.

2. A fastener attachment according to claim 1, wherein the upturned channel edge comprises a shoulder at a distal end thereof, the shoulder extending from the upturned channel edge toward the main panel.

3. A fastener attachment according claim 1, further comprising an adhesive on the main panel opposite side.

4. A fastener attachment according to claim 1, wherein the fastener component comprises one of a male half and a female half of a snap fastener.

5. A fastener attachment according to claim 1, wherein the main panel, the fastener component and the channel are molded as one piece.

6. A windshield assembly comprising:
 a windshield securable to a boat hull; and
 a plurality of fastener attachments secured to the windshield spaced apart from one another along an edge of the windshield, each of the fastener attachments comprising:
 a main panel delimited by first and second ends,
 a fastener component secured on one side of the main panel between the first and second ends of the main panel, wherein the fastener component comprises one half of a two-part fastener, and
 a channel cooperable with the main panel and extending from an opposite side of the main panel and from one of the first and second ends, wherein the channel comprises a portion of the main panel opposite side, a channel bottom extending substantially perpendicularly from the portion of the main panel opposite side in alignment with the one of the first and second ends, and an upturned channel edge extending substantially perpendicularly from the channel bottom and substantially parallel with the main panel, and wherein the main panel and the channel are formed as one piece,
 wherein the channels of each of the plurality of fastener attachments are positioned over the edge of the windshield with the fastener attachments facing outward, wherein each of the plurality of fastener attachments is secured to the windshield and selectively positioned such that the windshield edge is positioned on the channel bottom of each of the plurality of fastener attachments between the portion of the main panel opposite side and the upturned channel edge.

7. A windshield assembly according to claim 6, wherein each of the fastener attachments comprises an adhesive on the main panel opposite side, and wherein the fastener attachments are secured to the windshield with the adhesive.

* * * * *